July 5, 1927.
S. J. BENS
1,634,642
LUBRICANT RETAINER OR DUST COVER
Original Filed Feb. 7, 1924
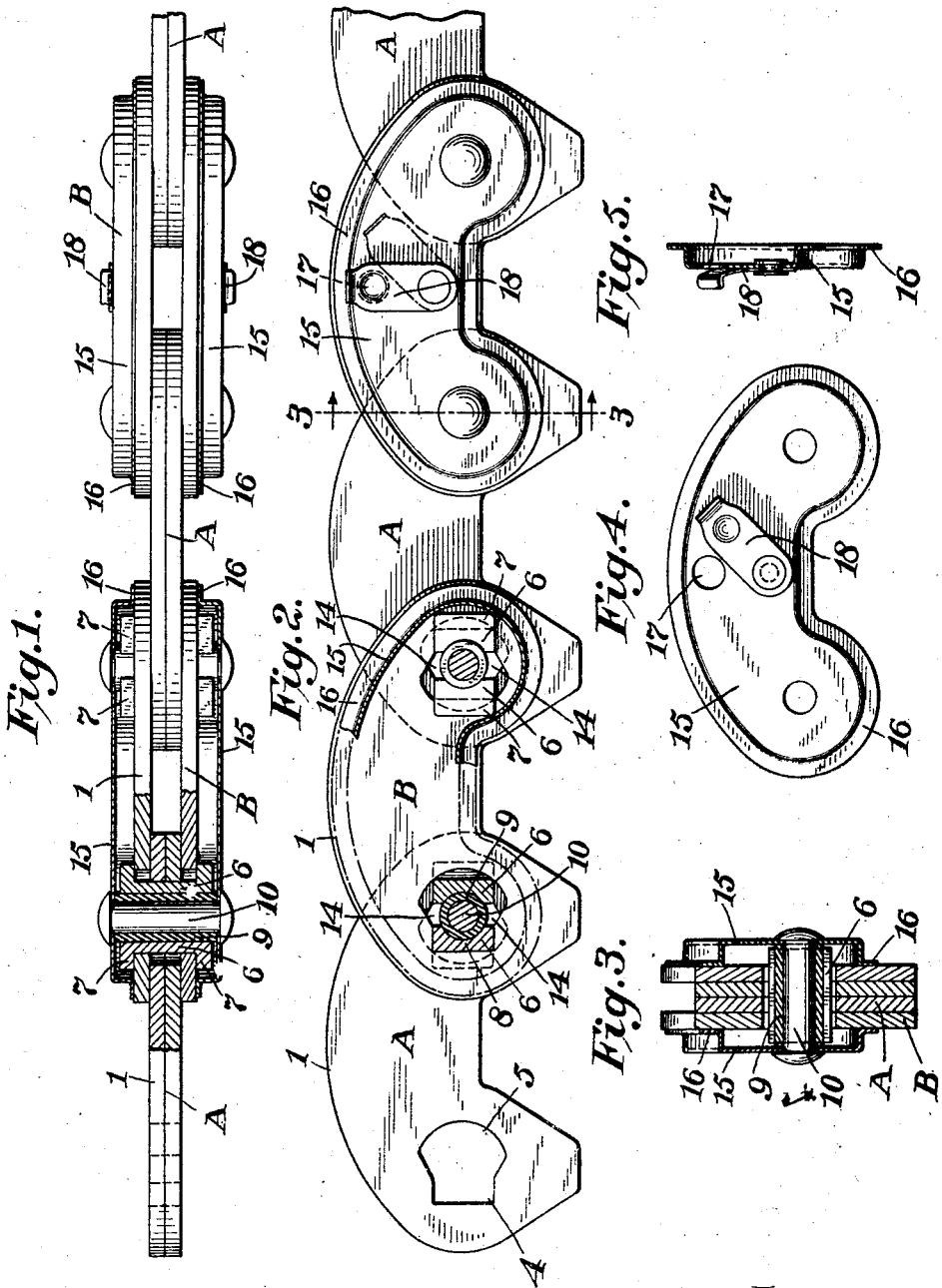
Inventor:
Samuel J. Bens,
by Spear, Middleton, Donaldson & Hall
Attys.

Patented July 5, 1927.

1,634,642

UNITED STATES PATENT OFFICE.

SAMUEL J. BENS, OF NEW YORK, N. Y.

LUBRICANT RETAINER OR DUST COVER.

Application filed February 7, 1924, Serial No. 691,248. Renewed November 16, 1926.

My present invention relates to link chains or belts and has particular reference to means whereby the joints or pivots between links may be kept lubricated in an efficient manner.

The invention further contemplates a dust protector or lubricant retainer which may function to prevent dust from gumming up the pivot joint between links, and also to retain sufficient lubricant in proximity to the link pivot that frequent renewal of such lubricant will not be necessary.

To this end my invention includes a chain comprising links having pivots between their overlapping ends and a dust or lubricant guard covering the pivot point and sufficient of the link surrounding the same to insure efficient results, and means to secure the lubricant cover to the link.

The invention further consists of the details of construction, arrangement and combination of parts shown in the accompanying drawings.

I have illustrated in the drawings a preferred embodiment, although it is to be understood that this is merely illustrative of the principle involved, and I do not wish to be limited to the exact disclosure therein.

In these drawings:

Figure 1 is an edge view, partly in section, of one embodiment of my invention.

Fig. 2 is a plan view, partly in section.

Figs. 3, 4, and 5 are details of the lubricator element and associated mechanism.

Referring now with particularity to the figures of the drawing, I have shown a link belt or chain to consist of links A and B, each comprising link plates 1 in the first instance superimposed one on the other, in the latter case separated, the extent of the link A, by reason of the fact that the plates comprising the link B overlap the end of the link A.

Apertures are provided in the ends of each link of such character that a part or all of the aperture in each link will coincide when the ends are lapped. Within this aperture may be placed a rivet, bolt or other device designed to hold the links together. It will be obvious that the particular form of rivet, bolt or other such device is not material, as various designs will occur to those skilled in this art. I have found, however, one which is suitable, but which is no part of this invention and is covered in another application for patent.

One satisfactory manner of securing the links A and B together is to provide each link plate 1 with an aperture in each end thereof, which will comprise a rectangular portion 4 and an arcuate portion 5. It will be apparent that by overlapping the ends of the links A and B certain portions of the aperture in each link will register and others not.

I provide bearing blocks 6 of substantially U-shape having short right angular ends 7 and a longitudinal arcuate groove 8 which forms a bearing surface. A block is now placed within the aperture of the overlapping ends of the links A and B in such manner that the main body of the block 6 occupies the rectangular portion of the aperture in the link B, the right angular ends 7 thereof overlying the link adjacent the aperture. In like manner a second block is made to occupy the right angular portion of the aperture in the link A. Between the two bearing blocks is placed a hardened sleeve 9 which is adapted to contact with the bearing surfaces 8 of the bearing blocks 6.

It will thus be seen that as the left hand bearing block 6 is keyed or held rigid in the right angular portion 4 in the aperture in the end of the link B, that this block will move with the link B about the sleeve 9 as an axis. Similarly the right hand block 6 is rigidly held in the link A and moves therewith. The arcuate portion of the aperture in each link allows the bearing block in the opposite link to move therein.

In order that the bearing surface between the sleeve 9 and the bearing surface 8 of the block 6 may be properly lubricated at all times, I provide a lubricant retainer 15 which may be of any desired construction, and which may be advantageously pressed from sheet metal, leaving an outwardly extending flange or edge 16. This lubricant retainer 15 may be placed upon the outside link B and the rivet 10 headed upon the same, which will effectively secure the retainer upon the outside of the link.

An aperture 17 is provided in the retainer 15 through which the lubricant may be introduced and a sliding cover 18 utilized to prevent leakage of the lubricant back through the aperture 17. It will be apparent that the space 14 in the aligning apertures of the links A and B exposes a portion of the bearing surface of the link 9 and provides a pathway for the lubricant within the retainer 15 to enter the bearings.

Having thus described my invention, what I claim is:

1. A link belt or chain including links having overlapped ends, means passing through the ends of each link to hold the overlapped links together in a pivotal manner, and a lubricant holder on the outside of one of said links covering both pivot means in said link and secured thereto by said pivot means.

2. A link belt or chain including links having overlapping ends, pivot means to secure the overlapped ends together, and a lubricant holder having a peripheral flange engaging the outside link and held thereon by said pivot means.

3. A link belt or chain including a link overlapping at each of its ends its neighbor, pivot means at each end of the first mentioned link, securing the first mentioned link and its neighbor together, a journal sleeve surrounding each of the pivot means, and a lubricant holder secured to the first mentioned link and overlying both journal sleeves.

4. A link belt or chain including a link overlapping at each of its ends its neighbor, pivot means having a bearing surface, at each end of the first mentioned link securing said link and its neighbor together, and a lubricant holder secured to the first mentioned link and extending over the bearing surface of both pivots.

5. A link belt or chain including links having overlapping ends, a headed rivet passing through said links to secure the overlapped ends together, a lubricant holder having a peripheral flange engaging the outside link, said rivet passing through said holder, the rivet head lying outside thereof.

In testimony whereof, I affix my signature.

SAMUEL J. BENS.